United States Patent [19]
Heckrotte, Sr. et al.

[11] 3,743,239
[45] July 3, 1973

[54] LOCK-OFF VALVE

[76] Inventors: John R. Heckrotte, Sr., 1625 E. Fairmount, Phoenix, Ariz. 85012; James P. Marcacci, 4041 E. Highland Avenue, Phoenix, Ariz. 85018

[22] Filed: Dec. 3, 1971

[21] Appl. No.: 204,590

[52] U.S. Cl. ............................... 251/111, 137/385
[51] Int. Cl. ............................................. F16k 35/00
[58] Field of Search ..................... 251/111; 137/385

[56] References Cited
UNITED STATES PATENTS

| | | | |
|---|---|---|---|
| 1,111,618 | 9/1914 | Schoof | 137/385 X |
| 3,172,282 | 3/1965 | Heckrotte | 70/178 |
| 2,825,357 | 3/1958 | Feighner | 251/111 X |

Primary Examiner—Henry T. Klinksiek
Attorney—Harvey B. Jacobson et al.

[57] ABSTRACT

A lock-off valve has a housing defining a flow path, a valve member arranged in the housing for rotation about an axis of rotation between an open position permitting flow through the flow path and a closed position stopping flow in the flow path, and a locking member mounted for rotation with the valve member about the axis of rotation. The locking member is locked with a relative movement parallel to the axis of rotation to be retained in the closed position.

9 Claims, 3 Drawing Figures

LOCK-OFF VALVE

BACKGROUND OF THE INVENTION

1. Field of the Invention

This invention relates to a lock-off valve, particularly a rotary plug valve, and especially a valve intended for use in gas and water lines.

2. Description of the Prior Art

It has long been sought to produce valves that are substantially tamper-free. Such valves are desirable in order for example, to prevent untrained persons from turning off, for example, water or gas, making repairs, and then turning back on the water or gas. If the repairs have not been properly done, the results could be disastrous, including flooding or an explosion.

Valves, and particularly rotary plug valves, that may be locked in at least the closed, or "off" position are known in the prior art. These known lockable valves generally use a movement transverse to the axis of rotation of the plug member to achieve the locking. Attempts to produce a virtually tamperproof valve using the transverse locking approach, however, have resulted in the development of very complicated and expensive valves.

SUMMARY OF THE INVENTION

It is an object of the present invention to provide a lock-off valve that is simple and inexpensive to construct. It is a further object of the present invention to provide a lock-off valve that conforms to federal law as set out by the National Safety Act in regard to gas valves.

These and other objects are achieved according to the present invention by providing a lock-off valve having a housing defining a flow path, a valve member arranged in the housing for rotation about an axis of rotation between an open position permitting flow through the valve path and a closed position stopping flow in the valve path, and means for locking the valve member in the closed position. The means for locking the valve member has a locking member mounted for rotation with the valve member about the axis of rotation, and means arranged in the housing for engaging with the locking member by a relative movement parallel to the axis of rotation so as to retain the valve member in the closed position.

In a preferred embodiment of the present invention, the locking member is selectively engaged by the means for engaging. The means for engaging in this embodiment has a locking element having an enlarged head and a threaded shank portion which is arranged in a threaded bore of the valve housing. A key element is provided which has an outer sleeve and an inner sleeve arranged in a bore defined by a bushing mounted in a wall of the valve housing. The inner sleeve is dimensioned to fit closely in a cavity defined in the enlarged head of the locking member. A ball is arranged in the inner sleeve to enter an aperture defined in the enlarged head once the inner sleeve is positioned in the cavity. The key element and the locking element are now rotatably connected together, and the shank can be selectively moved parallel to the axis of rotation by rotating the key element. A bore is defined in the locking member which mates with shank 40 when the valve member is in the closed position. Thus, the shank can enter the bore to lock the valve member against rotation.

In another preferred embodiment of the present invention, the means for engaging has a recess defined in the housing, and the locking member is resiliently biased toward said recess. In this embodiment, the valve member is automatically locked against rotation when moved to the closed position by the resiliently biased locking member snapping into the recess. The valve member may be unlocked by having the shank of a device such as that used for the first embodiment moving the locking member out of the recess.

An advantageous feature of the present invention is to mount the locking member on a shaft connected to the valve member for rotation therewith and arranged coaxially with respect to the axis of rotation. The locking member is mounted on this shaft for rotation therewith, and a retainer means is arranged on the shaft in contact with the locking member for keeping tension thereon.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
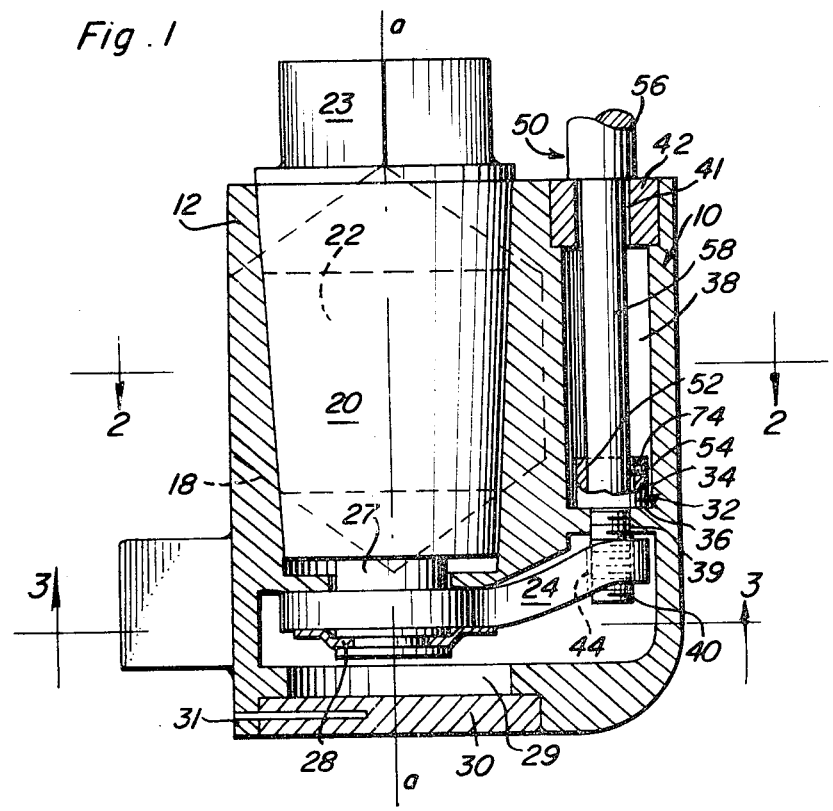
FIG. 1 is a sectional view taken generally along the line 1—1 of FIG. 2, but showing some elements not in section, and showing a preferred embodiment of a valve according to the present invention.
Figure 2:
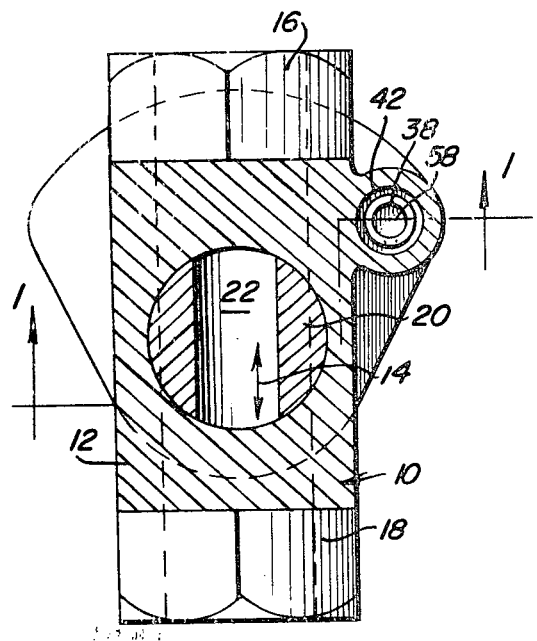
FIG. 2 is a sectional view taken generally along the line 2—2 of FIG. 1.

FIG. 1 of the drawings shows a, for example, lock-off rotary plug valve 10 according to the present invention having a housing 12 defining a flow path 14 (FIG. 2) through, for example, fittings 16 and 18, (FIG. 2). Fittings 16, 18 may have internal or external threads (not shown).

A, for example, plug valve member 20 defining a port 22 is arranged in housing 12 for rotation about an axis of rotation a-a between an open position (FIG. 2) permitting flow through flow path 14, and a closed position (FIG. 1) stopping flow in flow path 14. A handle 23 is preferably provided for moving valve member 20 between the open and closed positions.

Figure 3:
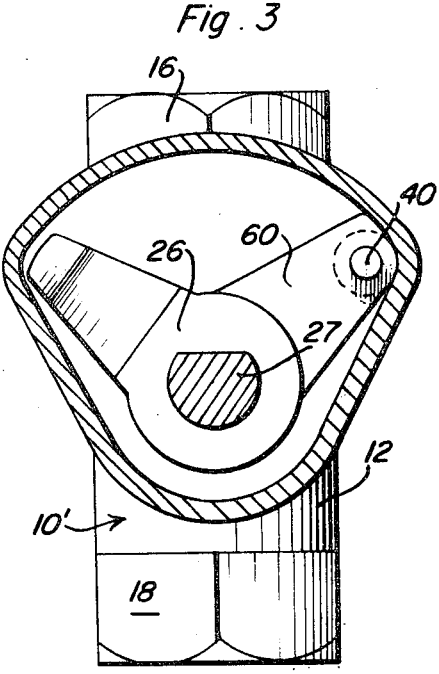
FIG. 3 is a sectional view taken generally along the line 3—3 of FIG. 1, and showing an alternative embodiment of a valve according to the present invention.

Means are provided for locking valve member 20 in the closed position. In the preferred embodiment shown in FIGS. 1 and 3, the means for locking has a locking member 24, 26, respectively, mounted for rotation with valve member 20 about axis of rotation a-a. A shaft 27 may be connected in a known manner to one end of valve member 20 for rotation therewith and arranged coaxially with respect to axis of rotation a-a, and locking member 24, 26 may be mounted on shaft 27 for rotation therewith. Member 24, 26 may be keyed onto shaft 28 in a suitable, known manner, such as shown in FIG. 3, and is retained thereon also in a suitable, known manner. FIG. 1 shows a retainer 28, such as a retaining ring sold under the tradename "Truarc" in the "Prong Lock" series. Such a retaining ring keeps tension on member 24, 26, which makes up for wear and any end play. An axial clearance is allowed member 20 for adjustment from wear due to the tension of retainer 28. Other means, such as a nut (not shown) threaded on a threaded portion (not shown) of shaft 27 could be used in place of retainer 28. Retainer 28, however, permits a more compact construction of valve 10.

An opening 29 may be defined in housing 12 to permit access to retainer 28. A cover member 30 as shown in FIG. 1 preferably blocks opening 29 during normal use of valve 10, and is held in place by, for example, at least one pin 31 fitted into bores so provided. Preferably, a plurality of pins 31, such as three (not shown) spaced, for example, 120° apart, are employed.

Means are arranged in housing 12 for engaging with locking member 24, 26 by a relative movement parallel to axis of rotation a-a and retaining member 24, 26 in the closed position.

In the embodiment of the present invention shown in FIG. 1, locking member 24 is selectively engaged by a locking element 32. Locking element 32 and an associated key element 50 are shown in more detail in U.S. Pat. No. 3,172,282 issued Mar. 9, 1965 to John R. Heckrotte, and the pertinent parts of the disclosure of that patent are incorporated by reference herein. Locking element 32 has an enlarged head 34, which may abut against a shoulder 36 partially defining a chamber 38 in housing 12. A threaded shank portion 40 of element 32 is threaded through a threaded bore 39 defined in housing 12.

Key element 50 has an outer sleeve 56 and an inner sleeve 58 arranged in a bore 41 defined by a bushing 42. Sleeve 58 is dimensioned to fit closely in a cavity 52 defined in head 34. A ball 74 is captively held in sleeve 58, and is arranged to enter an aperture 54 defined in head 34, and communicating with cavity 52, by means of a plunger (not shown) defining a camming surface (not shown) and arranged within sleeve 58 once sleeve 58 is positioned in cavity 52. Movement of the plunger parallel to axis $a-a$ will move ball 74 into and out of aperture 54. Key element 50 and locking element 32 are now rotatably connected together, and shank portion 40 can be selectively moved parallel to axis of rotation $a-a$ by rotating key element 50. Locking member 24 defines a bore 44 which mates with shank portion 40 of locking element 32 when valve member 20 is in the closed position.

In order to lock-off valve 10, valve member 20 is rotated to the closed position (FIG. 1) by means of, for example, handle 23, and shank 40 enters into bore 44 by turning key element 50 in one direction in head 34. Valve member 20 is now locked against rotation. Key element 50 must be turned in the opposite direction to unlock valve 10.

Since locking element 32 can only be turned in bore 39 by a special tool such as element 50, valve 10 is virtually tamper-proof.

FIG. 3 of the drawings shows an embodiment of the present invention which will lock automatically when moved to the closed position. In this preferred embodiment, the means for engaging has a recess 60 defined in housing 12, and a locking member 26 which is resiliently biased towards recess 60. Otherwise, the embodiment of FIG. 3 is constructed the same as the embodiment of FIG. 1. The embodiment of FIG. 1, as shown, may also have a recess 60 defined in housing 12. In this manner, the embodiment of FIG. 1 may be changed to the embodiment of FIG. 3 merely by replacing a locking member 24 with a locking member 26.

The valve of the embodiment of FIG. 3 may be locked by turning valve member 20 to the closed position as in the embodiment of FIG. 1. Now however locking member 26 will snap into recess 60, and valve member 20 is automatically locked against rotation.

Locking member 26 may be selectively released from recess 60 by postively engaging member 26 with, for example, shank portion 40 of locking element 32 and moving member 26 out of recess 60. This, of course, requires a special tool such as element 50 to turn locking element 32. When shank portion 40 moves member 26 outwardly from the plane of the drawing in FIG. 3, valve member 20 may be moved to the open position. Shank 40 should now be moved to a position permitting member 26 to snap into recess 60 and lock valve 10' when valve member 20 is again moved to the closed position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A lock-off valve, comprising, in combination:
   a. a housing defining a flow path;
   b. a valve member arranged in said housing for rotation about an axis of rotation between an open position permitting flow through the flow path and a closed position stopping flow in the flow path; and
   c. means for locking said valve member in the closed position, and including a locking member mounted for rotation with said valve member about the axis of rotation, and means arranged in said housing for engaging with said locking member by a relative movement parallel to the axis of rotation for retaining said valve member in the closed position, said means for engaging including a recess defined in said housing, and said locking member resiliently biased toward said recess.

2. A valve as defined in claim 1, further including means for selectively releasing said locking member from said recess by positively engaging said locking member and moving same out of said recess.

3. A valve as defined in claim 2, wherein said means for selectively releasing includes a locking element and an associated key element, a threaded shank portion on said locking element and a threaded bore defined in said housing for receiving said threaded shank portion, said locking element having an enlarged head defining a cavity and an aperture in said enlarged head communicating with said cavity; said key element including a sleeve dimensioned to fit closely in said cavity, and being provided with a ball captively held in said sleeve and arranged to enter said aperture by movement parallel to the axis of rotation of a plunger defining a camming surface when said sleeve is arranged in said cavity for rotatably connecting said key element to said locking element; said locking member arranged to mate with said shank portion when said valve member is in the closed position, whereby said shank portion may positively engage said locking member and move same out of said recess.

4. A valve as defined in claim 3, further including a bore defined by a bushing arranged in a wall of said housing, said sleeve being enterable into said bore.

5. A valve as defined in claim 1, further including a shaft connected to said valve member for rotation therewith and arranged coaxially with respect to the axis of rotation, said locking member mounted on said shaft for rotation therewith, and retainer means arranged on said shaft in contact with said locking member for keeping tension thereon.

6. A valve as defined in claim 1, wherein the valve is a rotary plug valve, and said valve member is a ported plug member.

7. A lockable valve, comprising, in combination:
 a. a housing defining a flow path;
 b. a valve member arranged in said housing for movement between an open position permitting flow through the flow path and a closed position stopping flow in the flow path; and
 c. means for locking said valve member in one of the positions, and including a locking member mounted on said valve member for movement therewith, and means arranged in said housing for engaging with said locking member by a relative movement between the means for engaging and said locking member and including a recess defined in said housing, said locking member resiliently biased toward said recess.

8. A lockable valve, comprising, in combination:
 a. a housing defining a flow path;
 b. a valve member arranged in said housing for movement between an open position permitting flow through the flow path and a closed position stopping flow in the flow path; and
 c. means for locking said valve member in one of the positions, and including a locking member mounted on said valve member for movement therewith, and means arranged in said housing for selectively engaging said locking member by a relative movement between the means for engaging and said locking member, said means for engaging including a locking element and an associated key element, a threaded shank portion on said locking element and a threaded bore defined in said housing for receiving said threaded shank portion, said locking element having an enlarged head defining a cavity and an aperture in said enlarged head communicating with said cavity; said key element including a sleeve dimensioned to fit closely in said cavity, and being provided with a ball captively held in said sleeve and arranged to enter said aperture by movement parallel to the axis of rotation of a plunger defining a camming surface when said sleeve is arranged in said cavity for rotatably connecting said key element to said locking element, and a bore defined in said locking member and arranged to mate with said shank portion when said valve member is in the closed position, whereby said shank portion may enter said bore and lock said valve member in the closed position.

9. A valve as defined in claim 8, further including a bushing arranged in a wall of said housing, a further bore provided in the bushing, and said shank being enterable into said bore.

* * * * *